United States Patent [19]
Moff

[11] Patent Number: 5,361,532
[45] Date of Patent: Nov. 8, 1994

[54] FISHING BOBBER
[75] Inventor: Frank A. Moff, Latrobe, Pa.
[73] Assignee: Big 10 Tackle, Inc., Latrobe, Pa.
[21] Appl. No.: 62,921
[22] Filed: May 14, 1993
[51] Int. Cl.⁵ ............................................. A01K 93/00
[52] U.S. Cl. .................................... 43/44.9; 43/44.91
[58] Field of Search ................. 43/44.9, 44.91, 44.92, 43/44.95, 44.87, 44.88, 17.5, 17.6

[56] References Cited
U.S. PATENT DOCUMENTS

| | | | |
|---|---|---|---|
| 3,032,913 | 5/1962 | Voll | 43/44.91 |
| 3,353,294 | 11/1967 | Mundorff et al. | 43/44.91 |
| 3,381,407 | 5/1968 | McDougall | 43/44.91 |
| 3,736,690 | 6/1973 | Witkowski | 43/44.9 |
| 3,832,795 | 9/1974 | Wolfe | 43/44.9 |
| 3,990,172 | 11/1976 | Hagquist | 43/44.9 |
| 4,571,874 | 2/1986 | Smaw | 43/44.92 |
| 4,649,660 | 3/1987 | Kurka et al. | 43/17.6 |
| 4,696,125 | 9/1987 | Rayburn | 43/44.9 |
| 4,924,620 | 5/1990 | Kimberley | 43/44.9 |

Primary Examiner—P. Austin Bradley
Assistant Examiner—Chuck Y. Mah
Attorney, Agent, or Firm—Lawrence R. Burns

[57] ABSTRACT

A fishing bobber that attaches to a fishing line immediately behind the weight when casting. The fishing bobber comprises an elongate tube having flotation means on one end and a water fillable cavity on the other end. A guide tube is adjustably fastened to the flotation end so that its distal end extends beyond the flotation means a predetermined distance. The water fillable cavity has inlet water perforations on its substantially closed end and a perforation in its tube sidewall for allowing a fishing line to pass therethrough to the fishing line tube guide. A magnetic ring is provided around the perforation on the substantially closed end of the cavity and a metal ball is moveably located within the cavity so that when the ball is not contacting the magnetic ring the fishing line may not pass freely through the bobber and guide tube, and when the ball is contacting the magnetic ring the fishing line may not pass freely through the bobber and guide tube. An air exhaust hole is provided along with water inlet holes in the cavity end so that when the bobber rests horizontally on the surface of water the cavity slowly fills with water and causes the metal ball to come into contact with the magnetic ring. The bobber then tilts further so that the guide tube is raised further to the vertical with the surface of the water and pulls the weight off the bottom of the lake or pond. The invention further includes the method of fishing which comprises the steps of attaching the bobber to a weighted end of a fishing line and casting the bobber onto the surface of a body of water.

11 Claims, 3 Drawing Sheets

FISHING BOBBER

BACKGROUND OF THE INVENTION

The present invention has to do with fishing line casting bobbers and more specifically has to do with a casting bobber having an automatic depth finding mechanism and a mechanism for raising the weight off the bottom of a lake or pond by a predetermined amount.

When fishing, a useful device for indicating when a fish is on the line is a fishing bobber. Typically a fishing bobber is placed on a fishing line between the pole and the weight near the distal end of the line. The bobber usually must be placed a predetermined distance behind the sinker so that the weight and therefore the hook will dangle a desired distance below the surface of the water. In some cases it may be desirable for the hook to be a few inches or a few feet below the surface but on other occasions it will be desirable for the sinker and hook to be just above the bottom of the lake, pond or body of water where on is fishing. Unless one has a depth finder and takes it along with him it is almost always impossible to determine how deep one must go or allow the hook and sinker to go before the bottom is almost reached. Even when one has determined the bottom at one location through trial and error the distance might change when the location changes. Another consideration is that casting efficiency is enhanced when the bobber and weight are located adjacent one another so that the tackle does not tangle during the casting process.

OBJECTS OF THE INVENTION

Accordingly it is an object of the present invention to provide a fishing bobber that automatically allows the weighted end of a fishing line to seek the bottom of a pond or lake.

It is an object of the present invention to provide a bobber that has a means for preventing fishing line from passing freely through said bobber after the weighted end of the fishing line has reached bottom.

It is an object of the present invention to provide a fishing bobber with an adjustable guide tube for a fishing line that will raise the weighted end of the fishing line off the bottom a predetermined distance.

It is an object of the present invention to provide a fishing bobber with an automatic depth finding mechanism for fishing off the bottom of lake and ponds.

It is a still further object of the present invention to provide a bobber that may be located on a fishing line intermediate the weight and fishing pole when casting and adjustable between the weight and fishing pole after casting the fishing line.

It is a still further object of the present invention to provide a fishing bobber that allows easy casting of the weight, bobber and hook, and further allows the weight to seek bottom and then automatically lifts the weight off the bottom a predetermined amount.

It is a still further object of the present invention to provide a method of fishing that allows a bobber and weight to be cast efficiently, allows for adjustment of the weight from the bobber after casting and then prevents further adjustment of the weight from the bobber after the weight hits the bottom of a lake or pond.

BRIEF SUMMARY OF THE INVENTION

According to the present invention there is provided a fishing bobber which comprises an elongate tube having opposing substantially closed ends with flotation means on one end and a water fillable cavity on the other end. A fishing line guide tube is mounted on the flotation end by an interference fit with a perforated lug attached to the tube. The guide tube has an internal diameter through which a fishing line may freely slide or pass. The fishing line is routed through one end of the bobber and then through the guide tube. There is provided means for allowing the fishing line to slide freely through the bobber and guide tube when the bobber is in a first position and for preventing the fishing line from sliding freely through said bobber and guide tube when the bobber is in a second position.

The construction of the bobber according to the present invention preferably comprises a hollow elongate tube with end caps removeably attached to the opposing and open ends of the tube. Located in the water fillable cavity is a magnetic ring located on the distal end of the water fillable cavity and a ball of magnetic material moveable within the water fillable cavity to contact the magnetic ring. Further located in the water fillable cavity is a ball retention area to tend to hold said ball away from said magnetic ring while said bobber is in a first position and allow movement of the ball into contact with the magnetic ring when the bobber is in a second position.

According to the present invention the flotation end preferably comprises a water flotatable material filling the hollow end of the elongate tube. Another construction for the flotation end comprises an intermediate seal between the water fillable cavity and the flotation end and a removeable cap on the other end of the flotation end of the elongate tube.

The invention further contemplates means for adjusting the position of the guide tube on the flotation end comprising lug means on the elongate tube with a perforation through the lug means for receiving the guide tube and wherein the perforation has an interference fit with the outside diameter of the guide tube.

The invention further contemplates the location of lighting material in the flotation end of said tube. Preferably the light source will be provided by locating a glo-stick such as a CYALUME (Registered Trademark of American Cyanamid) Lightstick in the hollow flotation end of the Bobber.

The invention further contemplates the method of fishing which comprises the steps of attaching a bobber to the weighted end of a fishing line, providing a fishing line guide tube on the bobber so that it extends beyond the flotation end of the bobber by a predetermined distance. The bobber and the weighted end of the line is then cast so that the bobber rests horizontally on the surface of the body of water while allowing the fishing line to pass freely through the bobber and guide tube until the weighted end strikes bottom and stops moving. The fishing line is then clamped so that it cannot pass freely through the bobber and guide tube and the bobber is tilted so that the guide tube pulls the weighted end of the fishing line toward the surface of the water.

DETAILED DESCRIPTION OF THE INVENTION

Figure 1:
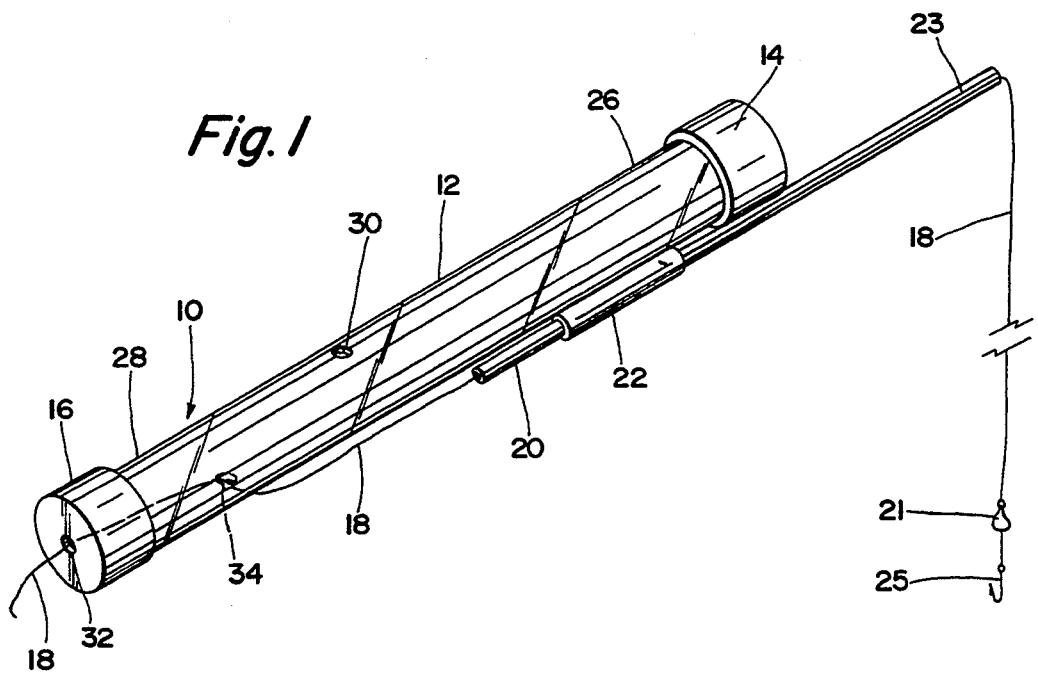
FIG. 1 is a perspective view of the fishing bobber according to the present invention.

What is shown in FIG. 1 is a perspective view of the fishing bobber (10) according to the present invention. The fishing bobber (10) is comprised of a cylindrical tube (12), preferably made of a clear plastic material, and having end caps (14) and (16) substantially closing off and sealing the open ends of the clear cylindrical tube (12). The end cap (16) has a small perforation or entry point for fishing line (18) to enter and a second perforation at (34) allows the fishing line (18) to exit the side of the cylindrical tube (12). A fishing line guide tube (20) is slidingly attached to a lug means (22) so that the adjustment of the position of the guide tube (20) along the length of the cylindrical tube (12) may be made.

The tube (20) has a small interference fit with the inside diameter of the perforation in the lug means (22) so that the guide (20) may be slipped forward or backward as desired and it will retain its position at rest. The lug means (22) is attached to the outside diameter of the cylindrical tube (12). The fishing line (18) has attached to it the weight (21) and fishing hook (25) shown in FIG. 1.

The cylindrical tube (12) is divided into two sections, with a section (26) providing a flotation means for the fishing bobber (10). The flotation means may be preferably constructed in two ways. One way is to provide an intermediate seal between the flotation end (26) and the hollow end (28) of the bobber (10) so that the end (26) is also hollow and has an air space sufficient to float the bobber (10). Another means of furnishing the flotation means is to fill end (26) with a floatable foam (30) which fills the cavity. When the flotation end (26) has an intermediate seal between ends (26) and (28), end cap (14) may be removed so that a light source may be placed in end (26) for night fishing.

Figure 2:
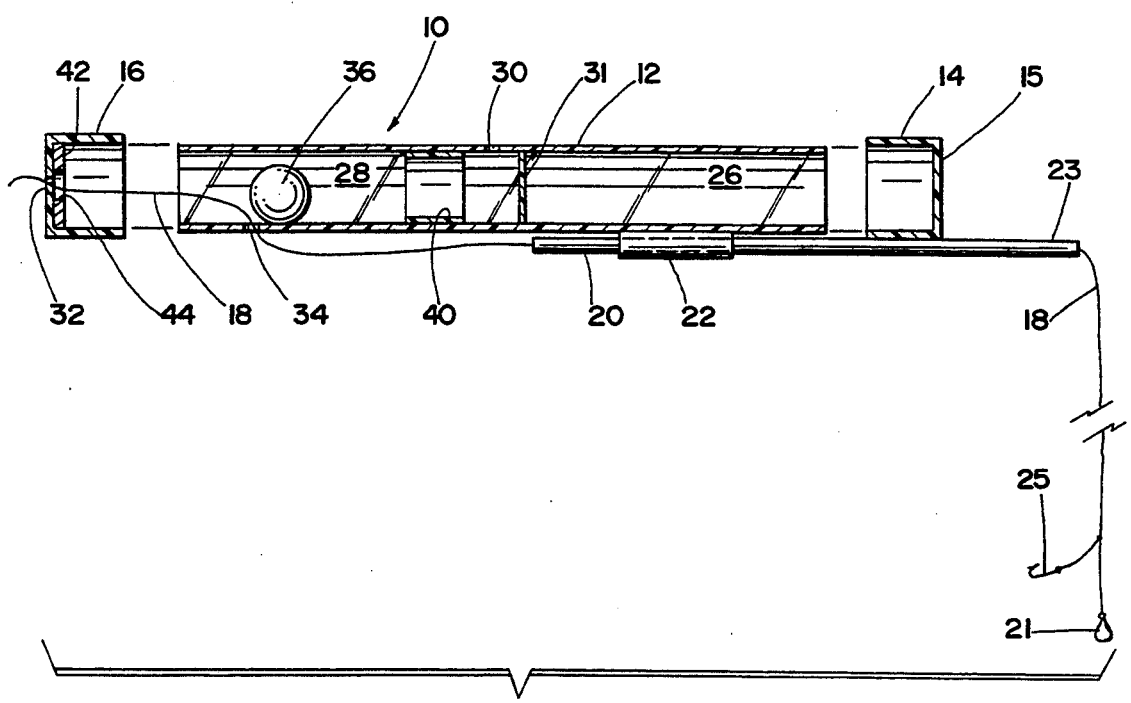
FIG. 2 is a sectional side view of the fishing bobber according to the present invention.

Shown further in FIG. 2 is the bobber (10) having the flotation end (26) and the opposing end (28) of the hollow cylindrical tube (12). The tube (12) has a hole (30) formed in the tube so that the end (28) may fill with water. Usually the hollow (30) will be an air escape hole so that water may infiltrate either of holes (32) or (34) and filling end (28) with water. The guide tube (20) and its lug means (22) have been explained in FIG. 1. The fishing bobber (10) according to the present invention further includes a steel ball (36) which is housed in the end (28) of the fishing bobber (10). Shown in the cross section view is a rest space or trough shown at (40) for the steel ball (36) and also shown on the end cap (16) is a magnetic ring (42) having a central perforation (44) running through it so that the fishing line (18) may freely pass through the perforations (32) and (44) and freely pass out through the perforation (34) in the cylindrical tube (12).

The metal ball (36) will have two positions during the operation of the fishing bobber (10). The first position will be that the ball (36) will be located at rest in the ball rest or trough area (40) and the second position for the metal ball will be down against the perforation (44) of the magnetic ring (42) located in end cap (16).

It is the purpose of operation of the fishing bobber invention (10) that whenever the line is first cast the metal ball (36) will rest in area (40) and the fishing line (18) will be free to pass through the end cap (16) and perforation (34) of the cylindrical tube (12) so that the sinker (21) and hook (25) will travel outward from the pole together until the bobber (10) strikes the water. At the point where the bobber (10) strikes the water the metal ball (36) will rest in trough (40) and the sinker (21) will then pull the fishing line (18) through the perforations (34), (44) and (32), until the weight (21) strikes the bottom of the pond, lake or body of water being fished in. While the sinker (21) is seeking the bottom of the pond the end (28) will be filling with water coming in through the perforations (34), (44), (32) and air escaping through the hole (30). As the water pours in the closed or flotation end (26) begins to rise off the surface of the water away from the body of water and the end (28) begins to sink into the body of water thereby pivoting the bobber (10) around the center (31). When the bobber (10) has tilted to a sufficient degree the metal ball (36) will come out of its rest trough (40) and travel downward to the magnetic ring (42) with the surface of the metal ball (36) being clamped over the perforation (44) and trapping the fishing line (18) between the metal ball (36) and the magnetic ring (42).

In this manner the free movement of the fishing line ceases as the bobber (10) continues to rotate in the surface of the water. The continued rotation of the fishing bobber (10) will then lift the sinker (22) off the bottom of the lake by the amount determine by the adjustment of guide tube (20) in extending the end (21) of the guide tube (20) behind the end (15) of the bobber (10).

Figure 3:
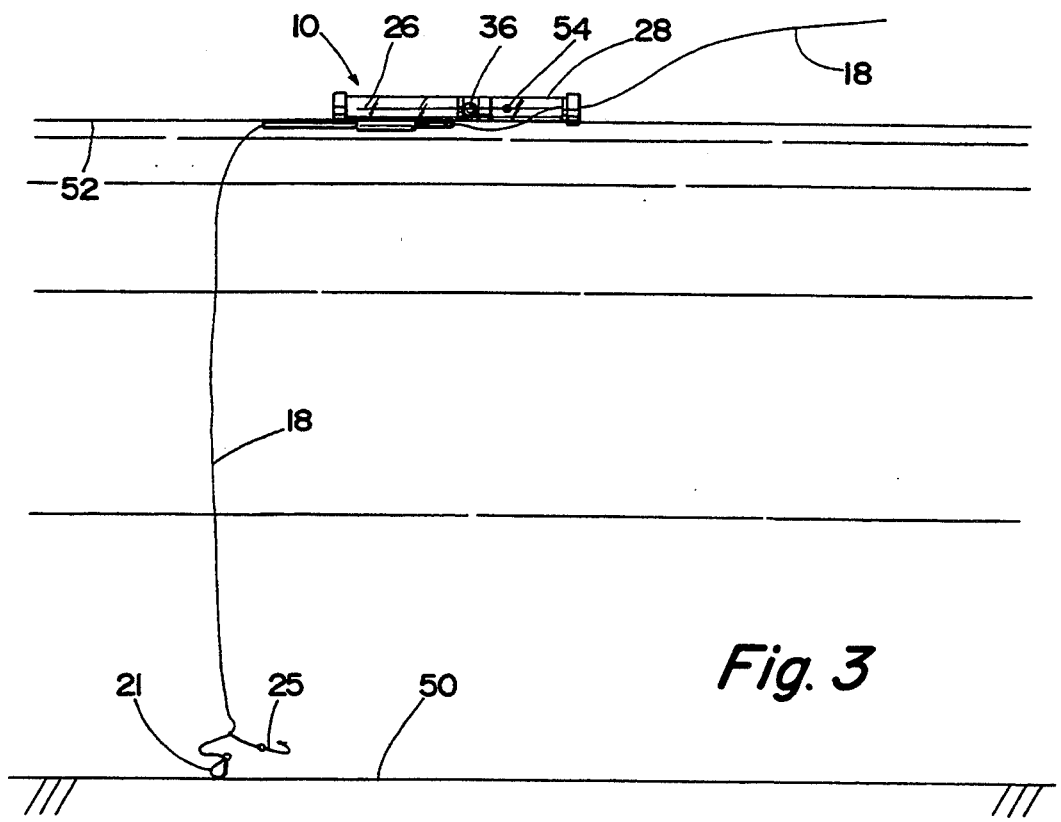
FIG. 3 is a view of the fishing bobber according to the present invention in a first position.
Figure 4:
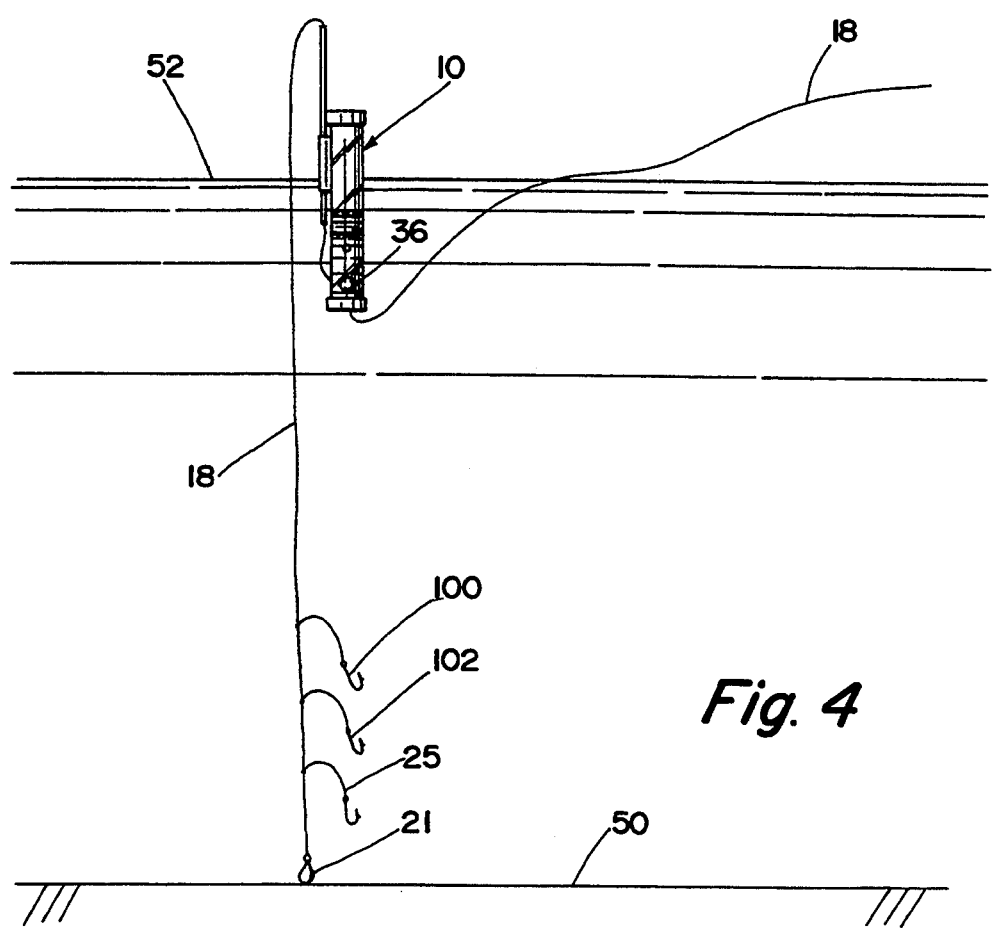
FIG. 4 is a view of the fishing bobber according to the present invention in a second position.

Shown in FIGS. 3 and 4 is the fishing bobber (10) in a first position in FIG. 3 and a second position in FIG. 4. In FIG. 3 the bobber (10) has just been cast onto the surface of the water with the line (18) extending back to the fishing pole on one end and the line (18) extending towards the bottom (50) of the lake or pond. A sinker (21) is shown freely falling towards the bottom (50) and line (18) will stop moving when sinker (21) hits the bottom (50) of the pond. The surface of the water is shown at (52) with the bobber (10) lying in a horizontal position with the surface of the water.

Perforations shown at (54) in the side wall of the bobber (10) will aid the end (28) in filling with water while the flotation end (26) will aid in the rotation of the invention bobber (10) to the position shown in FIG. 4.

Shown in FIG. 4 is the bobber (10) floating on the surface of the water (52) with the sinker (22) and the hook (24) being pulled a predetermined distance off the bottom (50) of the body of water. In FIG. 4 the metal ball (36) is resting solidly against the magnetic ring (42) so that the fishing line (18) cannot freely move through the bobber (10).

Figure 5:
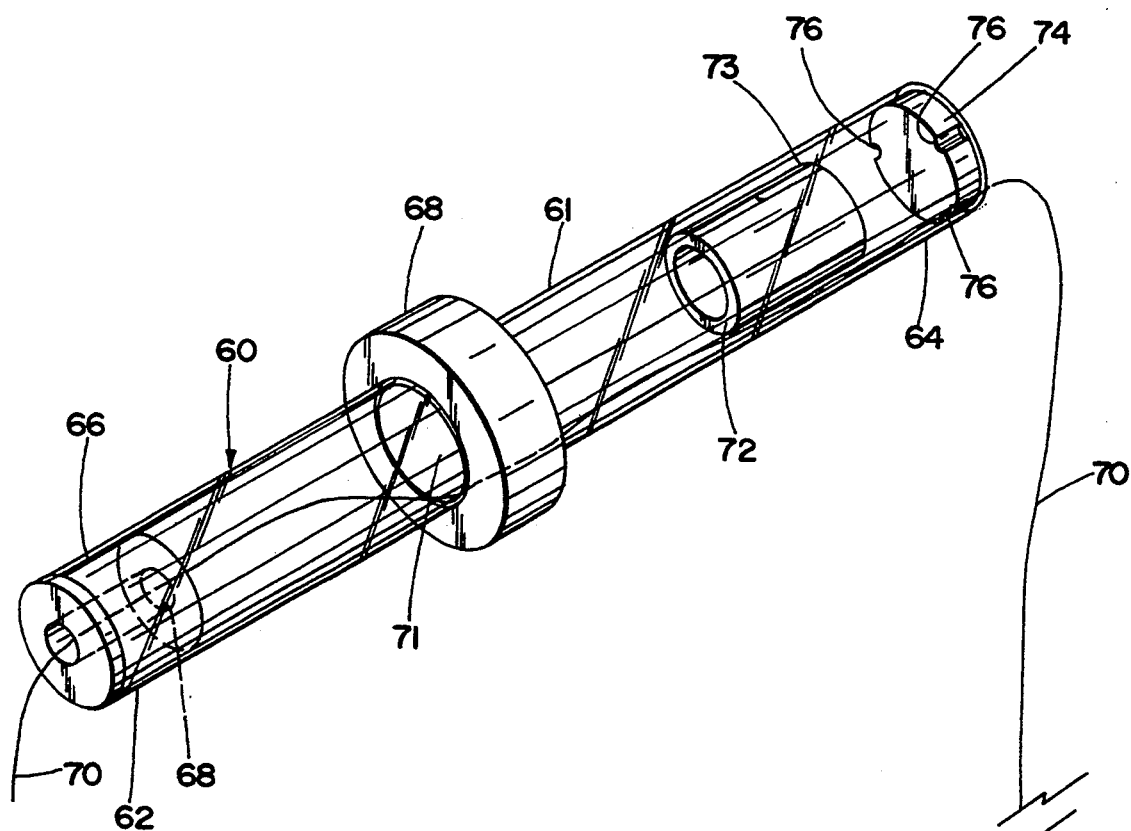
FIG. 5 is a perspective view of an alternate embodiment of the fishing bobber according to the present invention.
Figure 5:
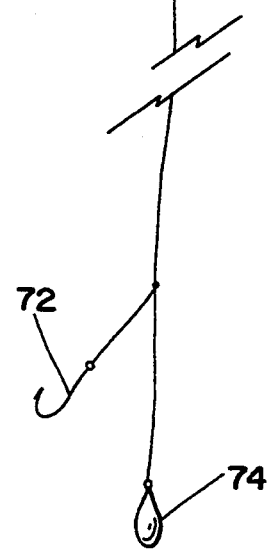

Shown in FIG. 5 is a fishing bobber (60) having opposing ends (62) and (64). The fishing bobber (60) is made of a cylindrical tube (61) that has opposing ends (62) and (64). End (62) has a plug (66) with a perforation (68) for allowing the fishing line (70) to pass into the cylindrical tube (61).

A float (68) is made of a foam or floatable material and it is surroundingly attached to the cylinder (61) intermediate at the ends (62) and (64) of the cylinder (61).

The center of the tube (61) has a plug (70) that acts as a stop where the cylindrical magnetic cylinder (72). Cylinder (72) is located inside tube (61) so that it may be movable between the plug (70) in the end (64) of tube (61). The end (64) has another plug (74) with slots (76) formed about it peripheral so that the fishing line (70) may pass through the slot (76) of the plug. And attached to the end of (70) is a fishing hook (72) and a sinker (74). Again the slots (76) not only let the fishing line (70) pass there through but also allow water to enter the inner diameter of cylinder (61).

As has been described earlier, cylinder (72) will be designed to move so that its end (73) abuts against the surface of plug (74) and clamps the fishing line (70) between end (73) and plug (74). When the fishing bobber fills with sufficient water to cause end (64) to tilt downwardly in the water.

The steel or metal ball 36 or the steel or metal cylinder 72 are preferably nickel coated to prevent corrosion due to contact with water.

An advantage of the present invention is that extra hooks 100 and 102 may be added to the fishing line 18 and may be adjusted so that they are spaced about by a predetermined distance and the fishing line 18 will be pulled taught when the bobber rotates to its upright position.

The cylinder 12 may also be made from a colored plastic or other material that will make it more visible on the water. Presently an orange color has been contemplated and used.

The principles and preferred embodiments of the present invention have been described in the foregoing specification. However, the invention which is intended to be protected is not to be construed as limited to the particular embodiments disclosed. The embodiments are to be regarded as illustrative only, rather than restrictive. Variations and changes may be made by others without departing from the spirit of the present invention. Accordingly, it is expressly intended that all such variations and changes which fall within the scope of the present invention as defined in the appended claims be embraced thereby.

I claim:

1. A fishing bobber which comprises:
   a. an elongate tube having opposing substantially closed ends with flotation means on one end and a water fillable cavity on the other end;
   b. a fishing line guide tube on said one end through which a fishing line will freely pass;
   c. means for routing a fishing line through said bobber and said guide tube;
   d. magnetic means for allowing the fishing line to slide freely through said bobber and guide tube when in a first position and for preventing the fishing line from sliding freely through said bobber and guide tube when in a second position, said magnetic means comprising a magnetic ring located on a distal end of the water fillable cavity and a ball of magnetic material moveable within said water fillable cavity to contact said magnetic ring.

2. The fishing line bobber according to claim 1 in which said water fillable cavity further comprises a ball retention area in said water fillable cavity to tend to hold said ball away from said magnetic ring while said bobber is in a first position.

3. The fishing line bobber according to claim 1 in which said flotation end comprises a water floatable material filling said hollow end of said tube.

4. The fishing line bobber according to claim 1 in which said elongate tube having an intermediate seal between the water fillable cavity and said one end and a removable cap on the other end.

5. The fishing line bobber according to claim 4 which further comprises a light source located in said one end of said elongate tube.

6. The fishing line bobber according to claim 1 which further comprises means for adjusting the position of said guide tube on said one end.

7. The fishing line bobber according to claim 6 in which said means for adjusting said guide tube comprises lug means on said elongate tube and a perforation through said lug means wherein said perforation has an interference fit with the outside diameter of said guide tube.

8. A fishing bobber which comprises:
   a. an elongate hollow tube with opposing ends having removeably attached end caps substantially closing each opposing end, with flotation means on one end and a water fillable cavity on the other end;
   b. a fishing line guide tube on said one end through which a fishing line will freely pass;
   c. means for routing a fishing line through said bobber and said guide tube;
   d. means for allowing the fishing line to slide freely through said bobber and guide tube when in a first position and for preventing the fishing line from sliding freely through said bobber and guide tube when in a second position.

9. The fishing line bobber according to claim 8 which further comprises a magnetic ring located on a distal end of the water fillable cavity and a ball of magnetic material moveable within said water fillable cavity to contact said magnetic ring.

10. The method of fishing which comprises the steps of:
    a. selecting a fishing bobber and providing water inlet holes and air escape holes on one end of said bobber and a counter weight on said bobber so that water fills through said water inlet holes when said bobber hits the surface of a body of water;
    b. attaching the bobber to a weighted end of a fishing line;
    c. providing a fishing line guide tube on said bobber so that it extends beyond one end of said bobber a predetermined distance;
    d. casting said weighted end and said bobber onto a surface of water;
    e. allowing said fishing line to pass freely through said bobber and guide tube until said weighted end stops moving;
    f. clamping said fishing line so that it cannot pass freely through said bobber and guide tube;
    g. tilting the bobber so that the guide tube pulls the weighted end of the fishing line toward the surface of the water.

11. The method of fishing according to claim 10 which further comprises providing lighting material on said bobber for nighttime fishing.

* * * * *